Jan. 5, 1965
A. LICHOWSKY
3,164,735
INDEXING SYNCHRONOUS MOTOR
Filed Aug. 16, 1961
3 Sheets-Sheet 1
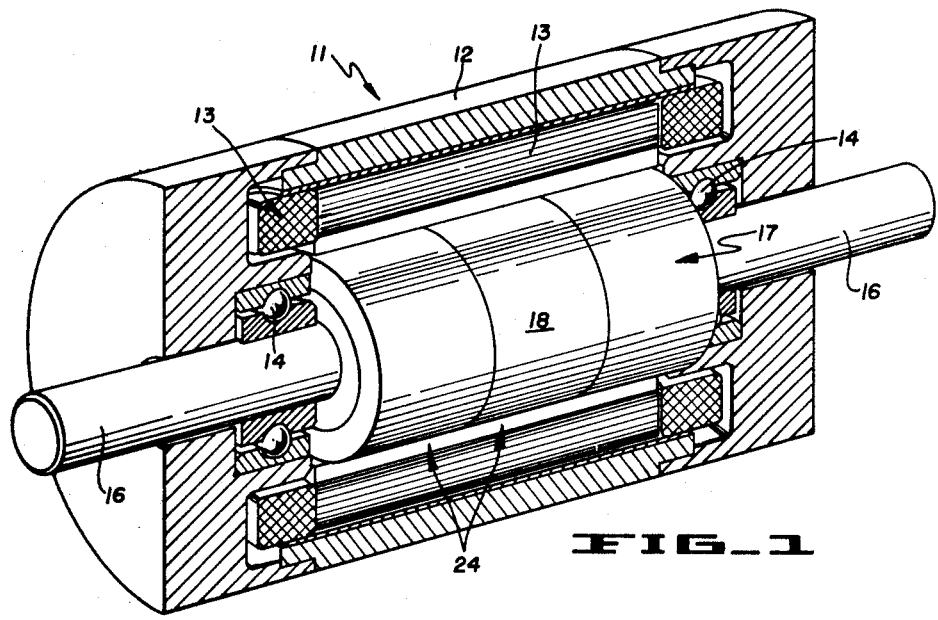
FIG_1
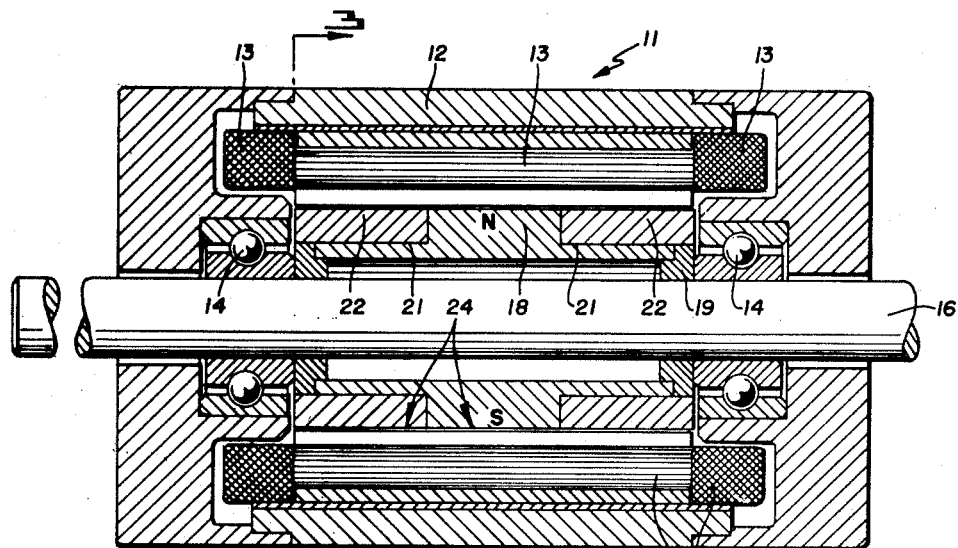
FIG_2
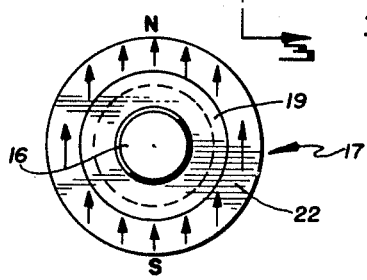
FIG_3
ABRAHAM LICHOWSKY
INVENTOR.
BY Robert S. Clay
ATTORNEY Jan. 5, 1965 A. LICHOWSKY 3,164,735
INDEXING SYNCHRONOUS MOTOR
Filed Aug. 16, 1961 3 Sheets-Sheet 2
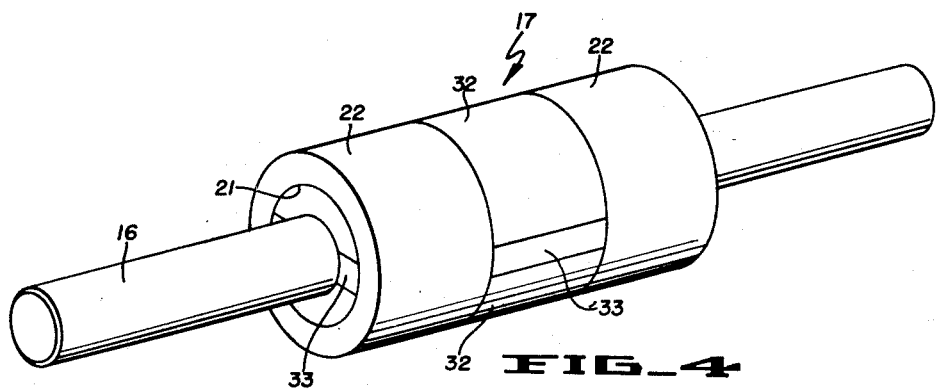
FIG_4
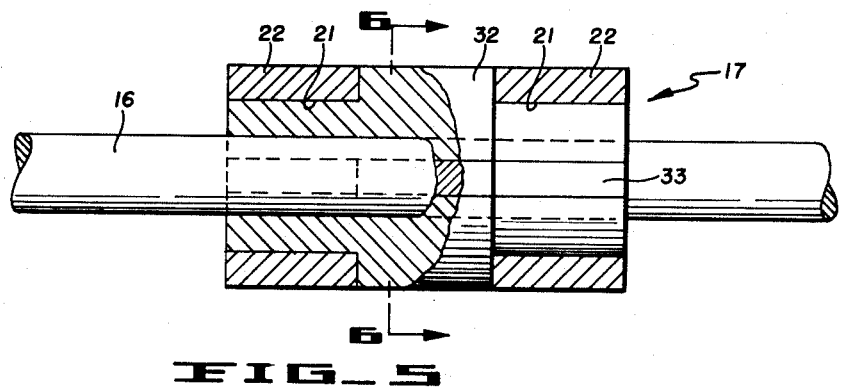
FIG_5
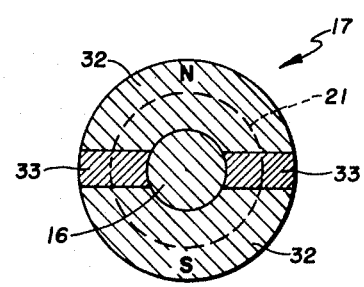
FIG_6
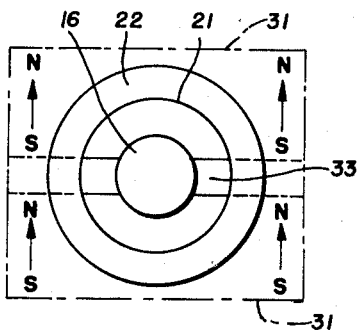
FIG_7
ABRAHAM LICHOWSKY
INVENTOR.
BY Robert G. Clay
ATTORNEY Jan. 5, 1965   A. LICHOWSKY   3,164,735
INDEXING SYNCHRONOUS MOTOR
Filed Aug. 16, 1961   3 Sheets-Sheet 3
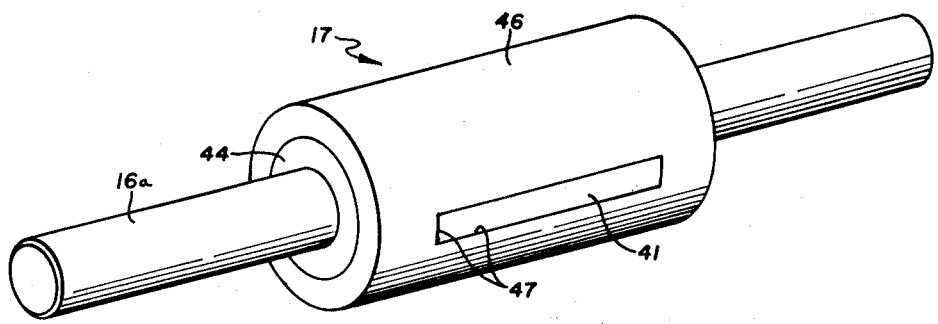
FIG_8
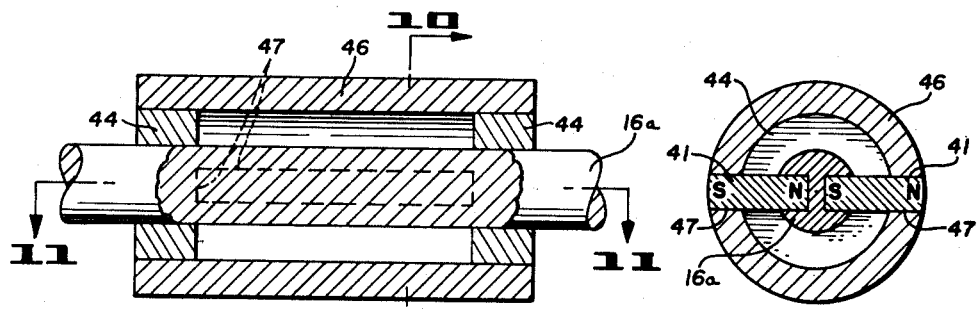
FIG_9   FIG_10
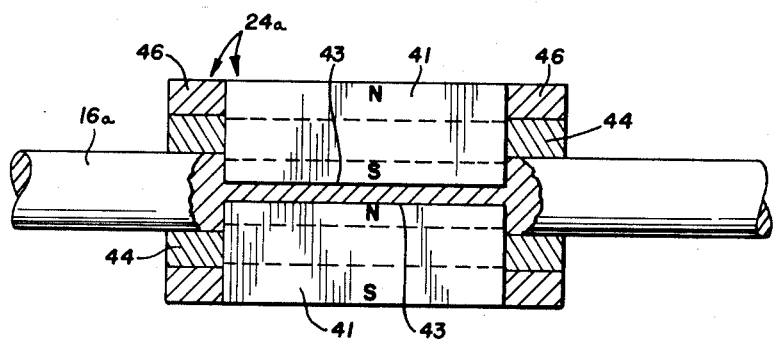
FIG_11
ABRAHAM LICHOWSKY
INVENTOR.
BY Robert G. Clay
ATTORNEY United States Patent Office 3,164,735
Patented Jan. 5, 1965

3,164,735
INDEXING SYNCHRONOUS MOTOR
Abraham Lichowsky, San Carlos, Calif., assignor to Ampex Corporation, Redwood City, Calif., a corporation of California
Filed Aug. 16, 1961, Ser. No. 131,887
7 Claims. (Cl. 310—156)

This invention relates to synchronous motors, and particularly to such motors operating by hysteresis effect.

Hysteresis synchronous motors usually have a stator including a coil that generates magnetic fields rotating in phase with the rotation of a remote electrical generator; and the motor is provided with a rotor in which are established a set of magnetic poles that are attracted by and that follow the rotating flux of the stator and cause the rotor to spin at the same angular velocity as the generator. Usually the poles of the rotor are established by induction from the flux of the stator, the rotor being composed of suitable hysteresis material for that purpose. The induced poles are ambulant or migratory with respect to the rotor during the starting period, when the rotor is not yet rotating as fast as the stator fields; but the poles settle to a fixed position in the rotor when it achieves operating speed. This self-starting effect is an advantage not present in motors that have predeterminedly magnetized poles. The latter are usually unable to start by themselves and must be preliminarily rotated and accelerated to nearly operating speed before they will pull into synchronism. Also, when the motor is operating in synchronism, any sudden alteration of driving current phase change velocity may cause the motor to pull out of synchronism, in such a way that synchronism is totally destroyed, at least temporarily and even permanently, so that the motor stops. On the other hand, hysteresis synchronous motors usually have the disadvantageous effect that, when the rotor does reach operating speed, the induced poles are only randomly oriented with respect to the shaft, and there is no predeterminable angular relationship between the shafts of the motor and generator. Furthermore, a sudden alteration of driving current phase change velocity may cause migration of the rotor poles so as to change the rotor-generator orientation unpredictably.

For certain uses, as for example to cause a pair of magnetic tape television recorders to operate in precise synchronism, it is desirable to have a synchronous motor in which the rotor and shaft rotate at a predetermined and unchanging angular orientation with respect to the shaft of the generator and with respect to the rotating magnetic fields of the motor stator. Such a tandem arrangement of recorders may be used for example in "playing back" two pre-recorded programs so that one of the programs is caused to "fade out" on the television screen while the other is caused to "fade in." It is important to have the rotating transducers very precisely coordinated so that the "fields" or "frames" of the two program pictures begin and end at the same instants; and it is proposed to bring about this effect by generating a signal from the rotating head drum of one recorder to drive a synchronous motor that in turn drives the rotating head drum of the other recorder. In such an arrangement, the requirement is for a motor that is as easy to start as a conventional hysteresis synchronous motor, and is also angularly indexing during full-speed operation so that the shafts of the two head drums always have the same angular relation.

While the effect desired has been achieved to some degree in the art by the use of servo loops and ordinary motors, the electronic apparatus required is quite expensive and must be made of high quality components to attain the accuracy and precision of alignment herein desired.

Accordingly, it is an object of the present invention to provide a self-starting synchronous motor in which the rotor and shaft always have the same extremely precise operating orientation with respect to the rotating flux produced by the stator, without the use of servo loops and associated electronic circuits.

It is another object of the invention to provide an indexing synchronous motor operating with a high degree of pull-out torque.

It is a further object of the invention to provide a hysteresis synchronous motor that pulls into operating phase with the stator-exciting current in predetermined fixed angular relationship thereto.

These and other objects of the invention are attained in a motor in which the stator produces a rotating flux in phase with the rotation of a remote generator, the rotor being formed of a first portion made of suitable hysteresis material for starting the rotation thereof, and a second portion made of permanently magnetized material, both portions being solidly mounted on the rotor shaft and defining a continuous cylindrical surface immediately adjacent the interior cylindrical surface of the stator. Thus in the hysteresis portion are established induced poles that are migratory during the starting operation but that settle at operating speed into precise alignment with the poles of the permanent magnet; and the permanent magnet poles are spaced as closely as possible to the stator so that substantially no error in the operating alignment results.

A better understanding of the invention may be had by reference to the following description, taken in conjunction with the accompanying drawings, in which:

FIGURE 1 is a broken away perspective view of a motor constructed in accordance with the invention;

FIGURE 2 is a cross section elevation view of a portion of the motor shown in FIGURE 1;

FIGURE 3 is an end elevation view of the rotor taken substantially on the plane of lines 3—3 of FIGURE 2;

FIGURE 4 is a perspective view of a variational form of the rotor of the invention;

FIGURE 5 is a cross sectional elevation view of the rotor shown in FIGURE 4;

FIGURE 6 is a cross sectional elevation view taken on the plane of lines 6—6 of FIGURE 5;

FIGURE 7 is a schematic view illustrating the manufacture of the rotor of FIGURE 4;

FIGURE 8 is a perspective view of another variational form of the rotor of the invention;

FIGURE 9 is a cross sectional elevation view of the rotor of FIGURE 8;

FIGURE 10 is a cross sectional elevation view taken on the plane of lines 10—10 of FIGURE 9; and FIGURE 11 is a cross sectional plan view taken on the plane of lines 11—11 of FIGURE 9.

Referring now to FIGURE 1, there is shown a motor 11 including a stator portion 12 wound with an electrical coil 13 in a manner well known in the art so that upon energization the coil 13 produces a rotating magnetic flux in phase with the rotation of a remote generator. A pair of bearings 14 support a rotor shaft 16 for coaxial rotation about the axis of flux rotation. On the shaft 16 is solidly mounted a rotor generally indicated by the numeral 17, the rotor being arranged to rotate in phase with the rotating flux.

The rotor 17 may be constructed in several forms, the important common feature being that it includes both a hysteresis portion and a permanent magnet portion defining a continuous cylindrical surface immediately adjacent the concave interior cylindrical surface of the stator. As shown in FIGURES 1-3, the permanent magnet portion is constructed as a hollow cylindrical sleeve 18 solidly affixed to the shaft 16 as by means of end mounting discs 19. The permanent magnet element 18 is cut-away at both ends to define two portions 21 of substantially smaller diameter on which are mounted a pair of cylindrical sleeves 22 formed of suitable hysteresis material, such material being well known in the art. The hysteresis sleeves 22 are solidly mounted and affixed to the portions 21 of the permanent magnet member and are additionally supported at the ends as by means of the spacing discs 19. In manufacturing this arrangment, the permanent magnet cylinder is cut out of a work piece of permanent magnet material in such a way that the magnetic orientation of the material is along a diameter of the cylinder and transverse to the axis of rotation of the shaft 16 as illustrated in FIGURE 3. Of particular importance in the arrangement is the feature that the three members 18 and 21 are machined to define a continuous outer cylindrical surface generally indicated by the reference numeral 24, so that both the hysteresis portions and the permanent magnet portion are spaced as closely as possible to the concave cylindrical surface defined by the interior of the coil 13.

In the operation of the motor 11, when the exciting current is first applied to the coil 13 to produce a rotating flux, the permanent magnet portion 18 responds relatively ineffectively to turn the shaft 16, because the poles established by the rotating flux move too rapidly and any incipient attraction and movement of the permanent magnet portion is almost immediately countered by the apparent reversal of the rotating poles with respect to the relatively massive and stationary magnetic element 18. However, the rotating flux does induce magnetization of the hysteresis material 22 in such a way as to establish magnetic poles therein that tend to follow the rotation of the rotating field. Furthermore the poles established in the hysteresis material tend to ambulate or migrate circumferentially around the cylindrical surface of the hysteresis material so that they are always very nearly opposite the apparent poles of the rotating flux. The rotating flux exerts a turning torque on the hysteresis material through the poles induced therein, and the rotor begins at first slowly to turn and then increases rotational speed until it is rotating at the same synchronous speed as that of the rotating field. In ordinary hysteresis synchronous motors, the operational orientation of the shaft 16 would be purely random with respect to the direction of polarization of the rotating field; but in the rotor of the invention the permanent magnet portion 18 establishes a perferred direction of eventual polarization for the rotor, and as a result when the rotor pulls into synchronism the poles that are established in the hysteresis material are always precisely aligned with the poles of the permanent magnet. Thus at operating speed the shaft 16 always has precisely the same relative orientation with respect to the rotating flux.

As a further advantage of the arrangement, when during operation at synchronous speed any instability becomes incipient, i.e., if a severe load is applied to the shaft 16 tending to pull it out of synchronism or if the rotational speed of the rotating flux suddenly changes; and if as a result the permanent magnet 18 gets even slightly out of phase with the rotating flux, then the synchronism is not lost but is immediately re-established by the corrective action of the hysteresis elements 22 much as described above for the operation during starting of the motor.

Referring now to FIGURES 4–6, there is shown an alternative construction of the rotor in which the shaft 16 and hysteresis sleeves 22 are arranged as before, but in which the permanent magnet portion is differently formed to take advantage of characteristics of certain magnetic materials.

It will be understood that a preferred material for the magnetic portion is a ceramic magnet material such as for example that known as "Indox V," which is manufactured in the presence of a magnetic field so as to be grain-orientated, and is therefore difficult to form into hollow cylindrical sleeves as described for the arrangement of FIGURE 1. In the arrangement of FIGURE 4, the magnetic portion of the rotor is manufactured as illustrated in FIGURE 7 by taking two bars 31 of such ceramic magnetic material and cutting them to form two longitudinal sections of a cylinder with the magnetic orientation thereof lying along a diameter of the cylinder. The resulting sections 32 are then fitted onto the shaft 16 and the interval between the magnetic sections is filled by two spacing elements 33 preferably made of soft iron for transmitting linking flux, and also formed as longitudinal cylindrical sections. The assembled elements 32 and 33 are then cut down at the ends to form the reduced diameter portions 21 for mounting of the hysteresis sleeves 22.

Another alternative arrangement for the rotor of the invention is illustrated in FIGURES 8–11 in which use is made of a pair of ceramic bar magnets 41 with a minimum of cutting and machining thereof. In this arrangement the mid-portion of shaft 16a is relieved on opposite sides to form a pair of magnet mounting flats 43 for solid mounting of the magnets 41 and for providing the closest possible spacing between the two magnets for more effective flux linkage therebetween. The magnets 41 are particularly formed to fit snugly upon the flats 43 and to extend to the peripheral cylindrical surface 24a of the rotor. However before the magnets are actually mounted, there are installed on the shaft 16a a pair of brass spacing sleeves 44; and upon the sleeves 44 is mounted the outer sleeve 46 of the hysteresis material. The sleeve 46 is relieved to define a pair of diametrically opposite openings 47 of the same size and shape as the flats 43 and aligned therewith. The magnets 41 are thereupon inserted through the openings 47 and secured in place between the sleeves 44 and upon the flats 43. It will be noted that in this arrangement also the magnets 41 and hysteresis material sleeve 46 defines a continuous outer cylindrical surface closely spaced from the interior cylindrical surface of the coil 13 of the stator.

Thus there has been described a synchronous motor including a stator that produces a rotating flux in phase with the rotation of a remote generator, and a rotor having a portion composed of hysteresis material and a portion composed of permanently magnetized material presenting a pair of diametrically opposite poles immediately adjacent the stator, both portions of the rotor defining a continuous cylindrical surface so that the magnetic portion is spaced just as closely to the stator as is the hysteresis portion thereof. In use, the motor described has been found capable of coming to and maintaining an alignment within the range of two micro-seconds of time base error.

What is claimed is:

1. A synchronous motor comprising: a stator producing a rotating flux; and a rotor mounted for rotation about the axis of said rotating flux, said rotor having a first portion composed of hysteresis material and presenting a surface conforming to and immediately adjacent said stator for starting said rotor at the beginning of operation, and a second portion solidly affixed to said first portion and composed of permanently magnetized material presenting a pair of diametrically opposite poles immediately adjacent said stator, whereby it is ensured that said rotor pulls into synchronism at operating speed with said rotor having a predetermined and unvarying orientation with respect to said rotating flux.

2. A synchronous motor comprising: a stator presenting a first cylindrical surface and producing a rotating flux about the axis thereof; and a rotor mounted for rotation about said axis, said rotor having a first portion composed of hysteresis material and presenting a second cylindrical surface immediately adjacent said first cylindrical surface of said stator for starting said rotor at the beginning of operation, and a second portion solidly affixed to said first portion and composed of permanently magnetized material presenting a pair of diametrically opposite poles immediately adjacent said first cylindrical surface of said stator, whereby it is ensured that said rotor pulls into synchronism at operating speed with said rotor having a predetermined and unvarying orientation with respect to said rotating flux.

3. A synchronous motor comprising: a stator presenting a first cylindrical surface and producing a rotating flux about the axis thereof; and a rotor mounted for rotation about said axis, said rotor having a first portion composed of hysteresis material for starting said rotor at the beginning of operation, and a second portion solidly affixed to said first portion and composed of permanently magnetized material presenting a pair of diametrically opposite poles, said rotor being formed as a unitary cylindrical member with said portions arranged side by side on the axis thereof and presenting a second continuous cylindrical surface immediately adjacent said first cylindrical surface of said stator, whereby it is ensured that said rotor pulls into synchronism at operating speed with said rotor having a predetermined and unvarying orientation with respect to said rotating flux.

4. A synchronous motor comprising: a stator presenting a first concave cylindrical surface and producing a rotating flux about the axis thereof; a non-magnetic shaft mounted for coaxial rotation with respect to said stator; a first cylindrical rotor portion solidly mounted on said shaft and composed of hysteresis material for starting said rotor at the beginning of operation; and a second cylindrical rotor portion solidly mounted on said shaft and composed of permanently magnetized material presenting a pair of diametrically opposite poles, said first and second rotor portions defining a continuous second convex cylindrical surface fitting within said stator and immediately adjacent said first cylindrical surface thereof, whereby it is ensured that said rotor pulls into synchronism at operating speed with said rotor having a predetermined and unvarying orientation with respect to said rotating flux.

5. A synchronous motor comprising: a stator peresenting a first concave cylindrical surface and producing a rotating flux about the axis thereof; a non-magnetic shaft mounted for coaxial rotation with respect to said stator; a first cylindrical rotor portion solidly mounted on said shaft and composed of hysteresis material for starting said rotor at the beginning of operation; and a second cylindrical rotor portion solidly mounted on said shaft and composed of permanently magnetized material presenting a pair of diametrically opposite poles, said first rotor portion being formed as a hollow sleeve fitting solidly on a conforming recessed portion of said second rotor portion and defining therewith a continuous second convex cylindrical surface fitting within said stator, and immediately adjacent said first cylindrical surface thereof, whereby it is ensured that said rotor pulls into synchronism at operating speed with said rotor and shaft having a predetermined and unvarying orientation with respect to said rotating flux.

6. A synchronous motor comprising: a stator presenting a first concave cylindrical surface and producing a rotating flux about the axis thereof; a non-magnetic shaft mounted for coaxial rotation with respect to said stator; a first cylindrical rotor portion solidly mounted on said shaft and composed of hysteresis material for starting said rotor at the beginning of operation; and a second cylindrical rotor portion solidly mounted on said shaft and formed of two permanently magnetized longitudinal outer sections of a cylinder and an intermediate spacing portion formed as a cylindrical longitudinal central section and made of soft iron, said sections defining a complete cylinder and presenting a pair of diametrically opposite poles, said first rotor portion being formed as a hollow sleeve fitting solidly on a conforming recessed portion of said second rotor portion and defining therewith a continuous second convex cylindrical surface fitting within said stator and immediately adjacent said first cylindrical surface thereof, whereby it is ensured that said rotor pulls into synchronism at operating speed with said rotor and shaft having a predetermined and unvarying orientation with respect to said rotating flux.

7. A synchronous motor comprising: a stator presenting a first concave cylindrical surface and producing a rotating flux about the axis thereof; a shaft mounted for coaxial rotation with respect to said stator, said shaft having a central portion cut away on opposite sides to leave two closely spaced parallel flats; a first cylindrical rotor portion solidly mounted on said shaft and composed of hysteresis material for starting said rotor at the beginning of operation, said first rotor portion defining a second convex cylindrical surface fitting within said stator and immediately adjacent said first cylindrical surface thereof, and being relieved to define two diametrically opposite openings therethrough aligned with and communicating with said flats; and a pair of permanent magnets solidly mounted in said openings and affixed to said flats, said magnets terminating at said second convex cylindrical surface defined by said first rotor portion and being magnetically aligned to present a first pair of poles of opposite polarity at said surface and a second pair of poles of opposite polarity at said flats, the magnetic flux between said magnets being linked through said shaft between said flats, whereby it is ensured that said rotor pulls into synchronism at operating speed, with said rotor and shaft having a predetermined and unvarying orientation with respect to said rotating flux.

References Cited in the file of this patent
UNITED STATES PATENTS
2,784,331   Rodemann _____ Mar. 5, 1957